July 12, 1960     A. H. KUGLER     2,944,577
PEAR SLICING MACHINE

Filed Dec. 11, 1957     3 Sheets-Sheet 1

INVENTOR.
ALBERT H. KUGLER
BY
*Lyon & Lyon*
ATTORNEYS

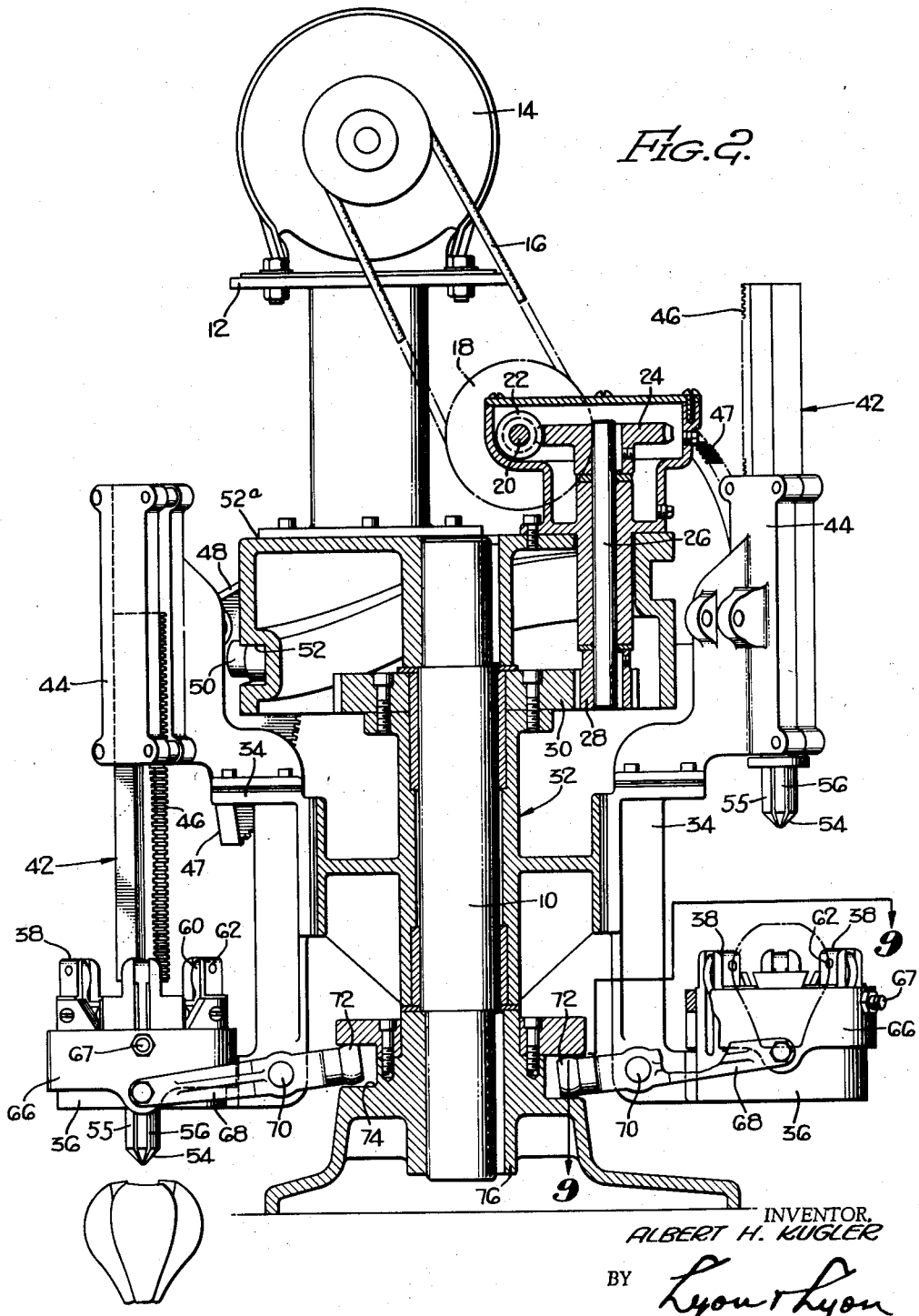

July 12, 1960     A. H. KUGLER     2,944,577
PEAR SLICING MACHINE
Filed Dec. 11, 1957     3 Sheets-Sheet 3
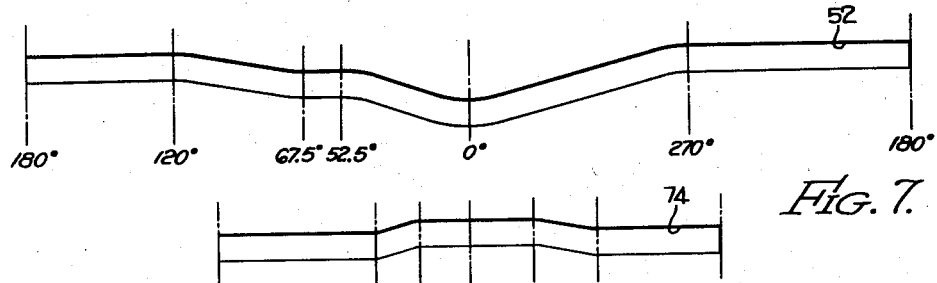
Fig. 7.
Fig. 8.
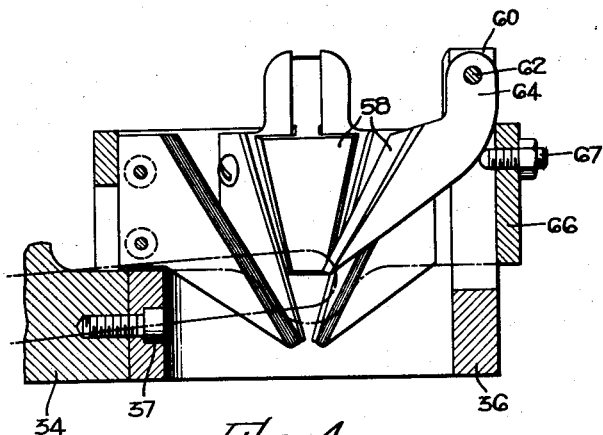
Fig. 4.
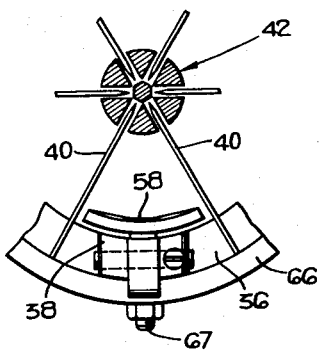
Fig. 6.
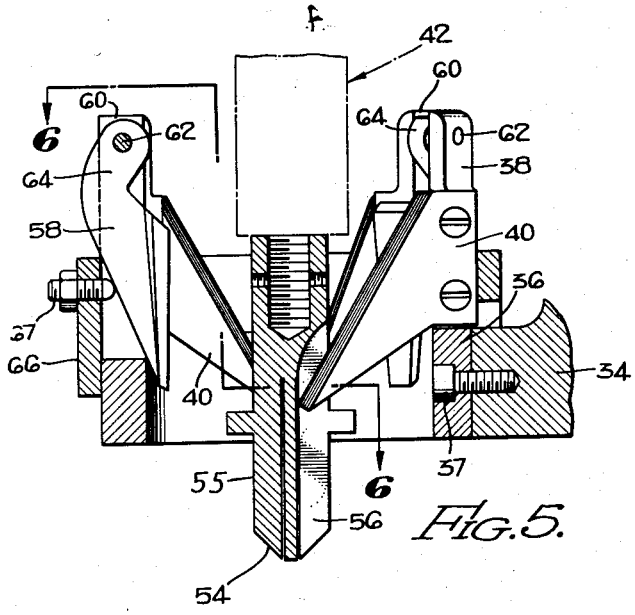
Fig. 5.
INVENTOR,
ALBERT H. KUGLER
BY
*Lyon & Lyon*
ATTORNEYS

United States Patent Office 2,944,577
Patented July 12, 1960

2,944,577

PEAR SLICING MACHINE

Albert H. Kugler, Oakland, Calif., assignor to California Packing Corporation, San Francisco, Calif., a corporation of California Filed Dec. 11, 1957, Ser. No. 702,128

5 Claims. (Cl. 146—169)

This invention relates to an improved pear slicing machine.

It is an object of this invention to provide a machine which effectively slices a pear into a plurality of uniform slices.

It is a further object of this invention to provide a machine which will produce a product of highest quality with a minimum of waste.

It is still a further object of this invention to produce a machine representing a greatly reduced capital expenditure and reduced labor involved in operating same.

It is still a further object of this invention to provide a machine in which pears which have been peeled and cored may be placed at a relatively rapid rate wherein same are positioned and sliced automatically and are of highest quality suitable for fancy packing.

Other objects and advantages are readily apparent from the following description.

In the drawings:

Figure 1 is a top plan view of the machine.

Figure 2 is a view taken along line 2—2 of Figure 1.

Figure 3 is an enlarged view taken along line 3—3 of Figure 1.

Figure 4 is a section of one of the fruit receiving elements illustrating the centering operation.

Figure 5 is a view similar to Figure 4 illustrating the slicing operation.

Figure 6 is a view taken along line 6—6 of Figure 5.

Figure 7 is a cam drawing for the combined orientator and pusher cam.

Figure 8 is a cam drawing for the cup cam.

Figure 9 is an enlarged view taken along line 9—9 of Figure 2.

In this embodiment a machine is illustrated comprising: a six-headed turret which rotates around a fixed shaft 10. Above the shaft is a stationary platform 12 supporting a motor 14 which through belt 16 drives pulley 18 mounted upon a shaft 20 carrying a worm gear 22 meshing with pinion 24 mounted upon shaft 26. Rotation of shaft 26 through a spur gear 28, driving gear 30 on turret 32, rotates the turret around fixed shaft 10.

The turret has six arms 34 each of which supports a pear slicing head. Since each head and its operation are identical the following description is applicable to any one of the six heads. Arm 34 is forked with the upper branch supporting the fruit orienting mechanism and the lower branch the fruit supporting and slicing device.

Fixed upon the lower branch of arm 34 is a ring 36, in this instance by screw 37. Mounted upon the upper edge of the ring are three brackets 38 equally spaced from one another. On each side of each bracket a knife 40 is supported thus providing six equally spaced knives. As a pear is pushed downwardly, as hereinafter will be described, it is sliced by these knives into six equal slices. The angle of the cutting surface of the knives with respect to the direction of travel of the fruit may vary but for proper cutting it should be around thirty degrees. As this angle increases the chances are increased that the fruit will be crushed instead of cut and as the angle is decreased the longer the cutting surface must be.

Mounted upon the upper branch of arm 34 is a combined fruit orientator and pusher 42. A slotted guide 44 is formed on the extremity of the arm to permit reciprocation of the orientator and pusher. To accomplish this reciprocation a portion of the orientator and pusher is provided with gear teeth 46 which mesh with teeth on gear segment 47 pivotally mounted by pin 48 on the next adjoining head. The gear segment has a cam follower 50 thereon which fits into a stationary cam track 52 formed in a stationary element 52a attached to platform 12. Thus as the head revolves, the combined orientator and pusher is reciprocated in alignment with the axis of the ring 36 in accordance with the contour of the cam track 52 which may be contoured in accordance with the diagram of Figure 7.

In operation the operator places a pear which has been peeled and cored onto the fruit support stem end down. As the combined orientator and pusher is lowered the tapered tip 54 on the head thereof enters the hollow core and shifts the fruit on its support to properly align same with the hollow cored portion upright. As the combined orientator and pusher is further lowered, the head thereon engages the pear about the hollow cored portion and forces the pear through the knives 40, the diameter of the head on the combined orientator and pusher being greater than that of the hollow fruit core immediately above the tip 54 at the portion designated 55. The lower extremity of the combined orientator and pusher 42 is provided with a plurality of slots 56 one for each knife to receive the knives during descent of the combined orientator and pusher.

To assist the fruit orienting three plates 58 having arcuate inner surfaces are pivotally mounted one between a pair of knives 40. To accommodate these plates each bracket 38 is slotted as at 60 and a pin 62 pivotally mounts the plates to the brackets with a camming portion of the plate designated 64 projecting outwardly of bracket 38. A pocket actuating ring 66 is telescopically mounted upon ring 36. As this ring 66 is raised with respect to ring 36 it carries set screws 67 which engage the camming portions 64 of plates 58 pivoting same upwardly between knives 40 and above the cutting edges of the knives (Fig. 4). With plates 58 in this position they form a fruit supporting cup to receive the pear during initial lowering of the combined orientator and pusher 42 providing a relatively smooth surface upon which the fruit may shift without injury thereto. After completion of this orienting phase ring 66 is lowered with plates 58 lowering under gravitational impetus, collapsing the fruit supporting pocket and exposing the pear to the cutting action of the knives. Adjustment of screws 67 varies the pivoting of plates 58 as desired.

To reciprocate actuating ring 66 the same is pivotally supported between a pair of forked arms of a bracket 68 which is pivotally mounted by pin 70 on arm 34. A cam follower 72 is formed upon the opposite end of the bracket which rides in a stationary cam track 74 formed in the support 76 for shaft 10. The cam may be formed in accordance with the diagram of Figure 8.

Thus in operation a cored and peeled fruit is positioned stem end down so that the hollow cored portion is generally upright in the fruit supporting cup formed by plates 58 when pivoted upwardly in the position shown in Fig. 4. As the turret rotates gear segment 47 is pivoted by cam follower 50 in cam track 52 lowering the combined orientator and pusher 42. The orienting tip 54 of the combined orientator and pusher enters the hollow core of the fruit and shifts same in the cup and to the desired position. The fruit supporting cup is then collapsed by cam follower 72 following cam track 74 and pivoting bracket 68 counterclockwise on the left in Figure 2 to lower actuating ring 66, thereby pivoting plates 58 back between blades 40 and exposing the fruit to the knives 40 so that further lowering of the combined orientator and pusher pushes the pear through ring 36 with knives 40 slicing same into six equal slices. After the pear has passed through the knives 40, the cam tracks function to raise the combined orientator and pusher 42 and actuating ring 66 to their uppermost position in preparation for receiving the next pear to be placed therein.

While what hereinbefore has been described as the preferred embodiment of this invention it is readily apparent that alterations and modifications can be resorted to without departing from the scope of this invention and such alterations and modifications are intended to be included within the scope of the appended claims.

I claim:

1. A machine for slicing pears or the like comprising: an annular support, radially arranged knives extending from said support inwardly with respect thereto, at least two supporting plates pivotally mounted on said support intermediate an adjacent pair of knives, each of said plates having an outer cam surface, and an annular axially movable actuating member disposed about said annular support in engagement with the outer cam surface of each of said plates, to cause movement of said plates from a supporting to a non-supporting position.

2. A machine for slicing pears or the like as defined in claim 1, including a combined orientator and pusher cooperable with a pear or the like having a hollow core when positioned on said plates to be sliced, to orientate the pear with the hollow core substantially vertical and to push the pear or the like through the knives, guide means reciprocably mounting said combined orientator and pusher for movement through said knives, and means connected with said combined orientator and pusher to reciprocate the latter.

3. A machine for slicing pears or the like as defined in claim 2, including slots in the orientator and pusher, one for each knife.

4. A machine for slicing pears or the like as defined in claim 1, including brackets mounted on said support, one for each plate, and means connecting a pair of knives and one of said plates to each bracket with the plates pivotally supported between a pair of knives.

5. A machine for slicing pears or the like as defined in claim 1, in which the support is mounted for rotation about a fixed axis, including stationary cam means, and means interconnecting said cam means and said actuating member to axially move the latter.

References Cited in the file of this patent

UNITED STATES PATENTS

| | | |
|---|---|---|
| 161,359 | Siler et al. | Mar. 30, 1875 |
| 193,959 | Howard | Aug. 7, 1877 |
| 2,437,637 | Bridge | Mar. 9, 1948 |
| 2,482,916 | Kane | Sept. 27, 1949 |
| 2,495,770 | Rivet | Jan. 31, 1950 |
| 2,513,341 | Marasco | July 4, 1950 |
| 2,521,590 | Manuel | Sept. 5, 1950 |
| 2,808,864 | Ganze | Oct. 8, 1957 |